Patented July 23, 1935

2,008,902

UNITED STATES PATENT OFFICE 2,008,902

COLORATION OF MATERIALS

George Holland Ellis, Tobias Ockman, and Henry Charles Olpin, Spondon, near Derby, England, assignors to Celanese Corporation of America, a corporation of Delaware No Drawing. Application March 19, 1931, Serial No. 523,940. In Great Britain May 15, 1930

22 Claims. (Cl. 8—5)

This invention relates to the treatment of materials and especially of materials such as films, fibres, threads, fabrics or filaments made of or containing organic derivatives of cellulose to obtain fast colorations thereon.

We have found that colorations, and especially those produced by the use of anthraquinone derivatives, particularly those containing free amino, or alkyl-amino groups, whether or not such anthraquinone derivatives contain other nuclear substituents, may be rendered more fast to acid and light by means of aralkylated aromatic amino bases and particularly N-alkyl derivatives of aralkylated aromatic amino bases.

Accordingly the present invention comprises broadly a process for the treatment of materials by incorporating therein one or more aralkylated aromatic amino bases before, at the same time as, or after the coloration of the material.

As examples of suitable compounds the following may be mentioned: benzyl ethyl aniline, benzyl methyl aniline and their homologues or nuclear substitution products.

Other substances capable of improving the fastness, for instance the ureas, thioureas and guanidines of British Patent No. 340,572, the compounds of British Patent No. 340,541 and/or inorganic compounds having an alkaline reaction, that is to say substances such as for example sodium carbonate, borax, disodium hydrogen phosphate, sodium acetate, sodium palmitate or sodium oleate containing an inorganic base, may be applied to the materials in addition to and separately from, or simultaneously with the aralkylated aromatic amino base. In the treatment of materials made of or containing cellulose esters such inorganic substances are preferably not sufficiently basic or alkaline, or are not applied in sufficient concentration, to produce a deleterious degree of hydrolysis on the cellulose ester. Textile materials may most conveniently be treated according to this invention either during dyeing or otherwise coloring or during a finishing or other after treatment.

The aralkyl aromatic amino base may be applied in any suitable manner. For example in the treatment of materials containing a cellulose ester or ether they may be absorbed from aqueous solutions of their salts, for example their hydrochlorides. Alternatively they may be applied in the form of aqueous dispersions produced in any suitable manner, for instance by the methods described in United States Patents Nos. 1,618,413, 1,618,414, 1,694,413, 1,690,481, 1,716,721, 1,803,008 and 1,840,572, and British Patents Nos. 322,737 and 323,788. The preparations containing aralkylated amino bases with dispersing agents and/or protective colloids form an important part of the present invention. The preparations may be in solid, powder, paste or more or less concentrated liquid form. Again where possible the aralkylated amino base may be applied in solution. From the point of view of ease of application the invention particularly contemplates the use of bases having a substantive affinity for the materials under treatment. The treatment of materials with a solution or dispersion containing up to 2 per cent. e. g. 0.2 to 1 per cent. of the bases gives very much improved fastness.

Compositions of matter may be made up containing an aralkylated amino base together with coloring matters, and particularly the coloring matter of the anthraquinone series containing free amino, or alkylamino groups. Such compositions which preferably contain the aralkylated amino base and the dyestuff in dispersed form, produced for example by means of any of the dispersing agents mentioned in the prior specification referred to in connection with the production of aqueous dispersions, also form part of the present invention, and may be applied directly to the coloration of the materials in fast shades.

A further method of incorporating the aralkylated amino base in artificial materials and particularly artificial materials made of or containing a cellulose acetate or other cellulose esters or ethers, consists in dissolving or otherwise incorporating the aralkylated amino base in the spinning solutions used in the manufacture of materials. Thus for example an acetone solution of cellulose acetate containing up to 2 per cent. of benzyl ethyl aniline or other aralkylated amino base (on the weight of the cellulose acetate) may be spun according to dry spinning methods to produce cellulose acetate filaments or yarns which are capable of being directly dyed in fast shades with amino anthraquinone dyestuffs.

The following examples illustrate methods of carrying our invention into effect, but it is to be understood that they are in no way limitative.

*Example 1*

This example illustrates the preparation of a dispersion of benzyl-ethyl-aniline.

Two parts by weight of 50% Turkey red oil are warmed to 45–50° C. and one part of benzyl-ethyl-aniline slowly run in with very good stirring. As the addition proceeds the mass becomes thicker, till finally a very stiff, stable, creamy emulsion is obtained.

*Example 2*

The following example illustrates the coloration of a cellulose acetate fabric in a dyebath containing benzyl-ethyl-aniline.

A cellulose acetate woven fabric is dyed in a suitable machine (e. g. a "jigger") with 0.6% of its weight of 1:4-di-(methyl-amino)-anthraquinone from a bath of 10:1 volume ratio. The bath is made up as is usual by adding a quantity of boiling 5% soap solution, sufficient to give a final dyebath concentration of 2½ grams per litre, to the requisite quantity of color in the form of a 20% dispersion in Turkey red oil, stirring till optimum dispersion is achieved, and adding through a filter cloth to the dyebath, to which is also added a dispersion of benzylethylaniline, containing 1½% of the base on the weight of goods, prepared as in Example 1, and suitably diluted with boiling soap solution. The goods are now entered and processed at 80° C. in the normal manner. Both dyestuff and protective agent are taken up by the fibre. When absorption is sufficient the goods are lifted, rinsed well, and passed through a 2 gram per litre solution of borax immediately before drying.

The color on the fabric so processed is far more resistant to the combined action of light and atmosphere contaminated with fumes or gases of an acidic nature, for example the products of combustion of coal gas, than is a shade of blue of equal depth obtained without addition of the benzyl-ethyl-aniline.

As already indicated the invention is of particular value in rendering fast to the combined agencies of light and acids colorations produced with anthraquinone derivatives and especially those containing free amino, or alkylamino groups. For this reason the process is most valuable in connection with treatment of materials made of organic derivatives of cellulose, e. g. cellulose acetate or other cellulose esters or ethers, for instance cellulose formate, cellulose propionate, cellulose butyrate or methyl, ethyl or benzyl cellulose or materials containing such cellulose derivatives associated with other fibres such as wool, cotton or silk. The invention may however be applied to the treatment of materials consisting wholly of wool or silk or other fibres. The invention is moreover by no means confined to improving the fastness of colorations obtained with anthraquinone derivatives, but may be applied to the improvement of the fastness of colorations obtained with other dyestuffs, for instance aralkylated aromatic amino bases may be employed for improving the fastness to light of colorations on cellulose ester materials produced by the processes described in British Patents Nos. 319,390 and 343,502.

What we claim and desire to secure by Letters Patent is:—

1. Process for improving the fastness of colorations on materials comprising cellulose acetate, comprising incorporating in the materials substantially colorless basic aralkylated aromatic amino compounds in which the aromatic residues are of the benzene series and retaining the basic aralkylated aromatic amino compounds as such in the materials.

2. Process for improving the fastness of colorations produced by means of anthraquinone derivatives containing free amino or alkyl amino groups on materials comprising organic derivatives of cellulose, comprising incorporating in the materials substantially colorless basic aralkylated aromatic amino compounds in which the aromatic residues are of the benzene series and retaining the basic aralkylated aromatic amino compounds as such in the materials.

3. Process for improving the fastness of colorations on materials comprising organic derivatives of cellulose, comprising incorporating in the materials 0.5 to 2 per cent. of their weight of substantially colorless basic aralkylated aromatic amino compounds in which the aromatic residues are of the benzene series and retaining the basic aralkylated aromatic amino compounds as such in the materials.

4. In a process for improving the fastness of colorations on textile materials comprising an organic derivative of cellulose by means of a substantially colorless basic aralkylated aromatic amino compound in which the aromatic residues are of the benzene series, incorporating said basic aralkylated aromatic amino compound in a solution of the cellulose derivative and spinning the solution to form filaments.

5. In a process for improving the fastness of colorations on materials comprising cellulose acetate by means of a substantially colorless basic aralkylated aromatic amino compound in which the aromatic residues are of the benzene series, incorporating said basic aralkylated aromatic amino compound in a solution of the cellulose acetate and spinning the solution to form filaments.

6. Process for improving the fastness of colorations on textile materials comprising incorporating in the materials substantially colorless basic aralkylated aromatic amino compounds in which the aromatic residues are of the benzene series and inorganic substances having an alkaline reaction and retaining said basic aralkylated aromatic amino compounds as such and also the inorganic substances in the materials.

7. Process for improving the fastness of colorations on textile materials, which comprises incorporating in the materials substantially colorless basic aralkylated aromatic amino compounds in which the aromatic residues are of the benzene series and retaining the basic aralkylated aromatic amino compounds as such in the materials.

8. Process for improving the fastness of colorations on textile materials comprising organic derivatives of cellulose, which comprises incorporating in the materials substantially colorless basic aralkylated aromatic amino compounds in which the aromatic residues are of the benzene series and retaining the basic aralkylated aromatic amino compounds as such in the materials.

9. Process for improving the fastness of colorations produced by means of anthraquinone derivatives containing free amino or alkylamino groups on materials comprising cellulose acetate, which comprises incorporating in the materials substantially colorless basic aralkylated aromatic amino compounds in which the aromatic residues are of the benzene series and retaining the basic aralkylated aromatic amino compounds as such in the materials.

10. Process for improving the fastness of colorations on textile materials, comprising incorporating in the materials benzyl ethyl aniline and retaining the benzyl ethyl aniline as such in the materials.

11. Process for improving the fastness of colorations on materials comprising organic derivatives of cellulose, comprising incorporating in the materials benzyl ethyl aniline and retaining the benzyl ethyl aniline as such in the materials.

12. Process for improving the fastness of colorations on materials comprising cellulose acetate, comprising incorporating in the materials benzyl ethyl aniline and retaining the benzyl ethyl aniline as such in the materials.

13. Process for improving the fastness of colorations on materials comprising cellulose acetate, comprising incorporating in the materials 0.5 to 2 per cent. of their weight of benzyl ethyl aniline and retaining the benzyl ethyl aniline as such in the materials.

14. Colored textile materials comprising an organic derivative of cellulose and containing a substantially colorless basic aralkylated aromatic amino compound in which the aromatic residues are of the benzene series.

15. Colored textile materials comprising cellulose acetate and containing a substantially colorless basic aralkylated aromatic amino compound in which the aromatic residues are of the benzene series.

16. Colored textile materials comprising cellulose acetate and containing benzyl ethyl aniline.

17. Colored textile materials containing substantially colorless basic aralkylated aromatic amino compounds in which the aromatic residues are of the benzene series.

18. A composition of matter for use in improving the fastness of colorations on materials, containing a substantially colorless basic aralkylated aromatic amino compound in which the aromatic residues are of the benzene series, and a substance selected from the group consisting of dispersing agents and protective colloids.

19. A composition of matter for use in improving the fastness of colorations on materials containing benzyl ethyl aniline and a substance selected from the group of dispersing agents and protective colloids.

20. A dyestuff preparation containing a dyestuff, a substantially colorless basic aralkylated aromatic amino compound in which the aromatic residues are of the benzene series and a compound selected from the group of dispersing agents and protective colloids.

21. A dyestuff preparation containing amino anthraquinone dyestuffs, a substantially colorless basic aralkylated aromatic amino compound in which the aromatic residues are of the benzene series and a compound selected from the group of dispersing agents and protective colloids.

22. A composition of matter containing an amino anthraquinone dyestuff, benzyl ethyl aniline, and a compound selected from the group of dispersing agents and protective colloids.

GEORGE HOLLAND ELLIS.
TOBIAS OCKMAN.
HENRY CHARLES OLPIN.